United States Patent [19]

Menzie

[11] Patent Number: 5,746,798
[45] Date of Patent: May 5, 1998

[54] CONTROL OF GLASS GOB DELIVERY FOR SIMULTANEOUS ARRIVAL AT BLANK MOLDS

[75] Inventor: Andrew B. Menzie, Toledo, Ohio

[73] Assignee: Owens-Brockway Glass Container Inc., Toledo, Ohio

[21] Appl. No.: 808,272

[22] Filed: Feb. 28, 1997

Related U.S. Application Data

[63] Continuation of Ser. No. 331,150, Oct. 28, 1994, abandoned, which is a continuation of Ser. No. 92,348, Jul. 16, 1993, abandoned.

[51] Int. Cl.⁶ .................................................. C03B 7/14
[52] U.S. Cl. .......................... 65/29.12; 65/122; 65/127; 65/158; 65/164; 65/225; 65/303; 65/304; 65/DIG. 13; 34/364
[58] Field of Search .................... 65/158, 163, 164, 65/225, 303, 304, 329, 62, 127, 129, 130, 29.11, 29.12, 29.17, 122, DIG. 13; 34/565, 579, 359, 364, 482; 406/19, 31, 50, 85, 108; 364/473.02

[56] References Cited

U.S. PATENT DOCUMENTS

| | | |
|---|---|---|
| 2,130,702 | 9/1938 | Wadsworth . |
| 2,141,425 | 12/1938 | Wadsworth . |
| 2,174,905 | 10/1939 | Wadsworth ............................. 65/304 |
| 2,859,559 | 11/1958 | Mumford . |
| 2,926,457 | 3/1960 | Trudeau . |
| 3,235,352 | 2/1966 | Hackett . |
| 3,293,017 | 12/1966 | Jenkins . |
| 3,340,038 | 9/1967 | Hartman ............................. 65/304 |
| 3,585,017 | 6/1971 | Trudeau . |
| 3,597,187 | 8/1971 | Trudeau . |
| 3,650,723 | 3/1972 | Wiley ................................ 65/169 |
| 3,732,086 | 5/1973 | Heyne ................................ 65/304 |
| 3,762,907 | 10/1973 | Quinn et al. ........................ 65/164 |
| 3,857,691 | 12/1974 | Jones et al. ........................ 65/303 |
| 3,893,835 | 7/1975 | Jones et al. ........................ 65/133 |
| 4,145,204 | 3/1979 | Farkas et al. ...................... 65/164 |
| 4,162,909 | 7/1979 | Peters ............................. 65/163 |
| 4,453,963 | 6/1984 | Larson et al. ...................... 65/163 |
| 4,469,501 | 9/1984 | Kingsbury et al. ................... 65/158 |
| 4,529,431 | 7/1985 | Mumford ............................ 65/225 |

*Primary Examiner*—Steven P. Griffin

[57] ABSTRACT

A method and apparatus are provided for controlling the delivery of multiple gobs to the blank molds of a glass forming machine having multiple cavities or sections, wherein multiple gobs are delivered from a glass feeder to plural scoops that are oscillated to deliver the gobs in multiples to aligned troughs and funnels in a timed sequence. An infrared gob sensor at each exit detects passage of a gob, and a computer controls application of air under pressure to control the velocity of delivery of each gob to the scoops in order to influence gob exit timing at the deflectors that are positioned adjacent the mold cavities.

3 Claims, 4 Drawing Sheets

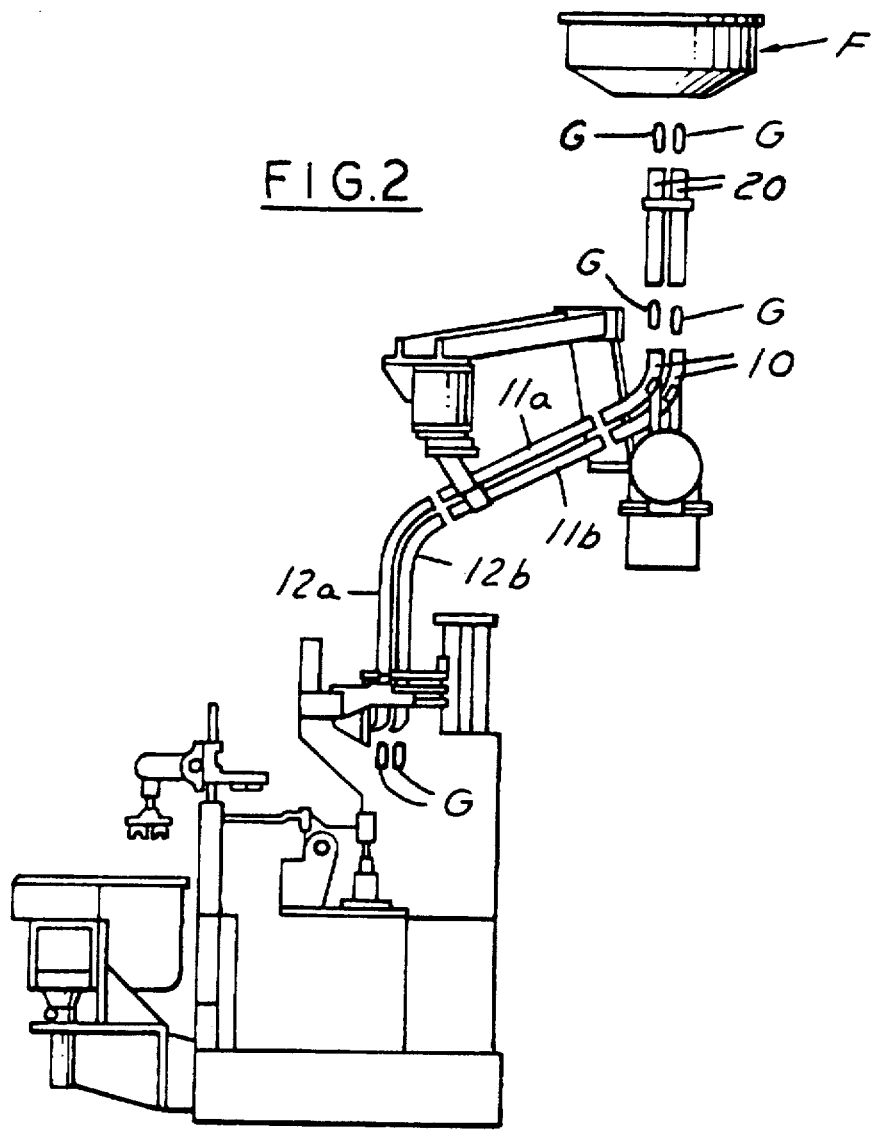

CONTROL OF GLASS GOB DELIVERY FOR SIMULTANEOUS ARRIVAL AT BLANK MOLDS

This is a continuation of application Ser. No. 08/331,150 filed Oct. 28, 1994, now abandoned, which is a continuation of application Ser. No. 08/092,348 filed Jul. 16, 1993 and now abandoned.

This invention relates to multiple glass gob delivery to glass forming machines.

BACKGROUND AND SUMMARY OF THE INVENTION

In the manufacture of glass articles in glass forming machines, such as in the machines known as I.S. machines, gobs of molten glass are delivered to blank or parison mold cavities. In such machines, the sections or units are arranged side by side in a straight row. Each section is a complete bottle forming machine comprising a blank mold, neck mold and blow mold, together with conventional take out apparatus for transferring the finished articles from the blow mold to a conveyor. Such a machine is shown in, for example, U.S. Pat. 1,843,160. It is desirable to provide simultaneous delivery by gravity of plural or multiple molten glass mold charges to each of the sections of the I.S. machine, one section at a time in a predetermined order.

Accordingly, apparatus had been devised that utilizes guide funnels interposed between the glass feeder, and movable scoops and the inclined delivery troughs of the individual sections of the I.S. machine. The scoops are oscillated in a horizontal plane to register in sequence with the troughs, which in turn deliver the gobs to funnels associated with the cavities of the blank molds of the machines. Typical apparatus for controlling such movement is shown, for example, in U.S. Pat. 2,859,559.

Among the objectives of the present invention are to provide a method and apparatus for controlling multiple gob delivery wherein all of the gobs associated with a given section arrive at the blank mold cavities at precisely the same time; wherein the method and apparatus provide for continual monitoring of the delivery and control of the movement of the gobs; which method and apparatus respond promptly to variations in order to control the delivery; which provide a running record of variation in gob arrivals, and a visual display of times and ranges of variations; and which provide for automatic shut down of a section in the event of extremely late gob arrival.

In accordance with the invention, a method and apparatus are provided for controlling the delivery of multiple gobs to the blank molds of a glass forming machine having multiple cavities or sections wherein multiple gobs are delivered from a glass feeder to plural scoops that are oscillated to deliver the gobs in multiples to aligned troughs and deflectors in a timed sequence. An infrared gob sensor at each deflector exit detects the passage of a gob, and a computer controls application of air under pressure to control the velocity of delivery of each gob to the scoops in order to influence gob exit timing at the deflectors that are positioned above the mold cavities.

DESCRIPTION OF THE DRAWINGS

FIG. 2 is a schematic diagram of multiple gob delivery in accordance with the invention.

DESCRIPTION

Figure 1:
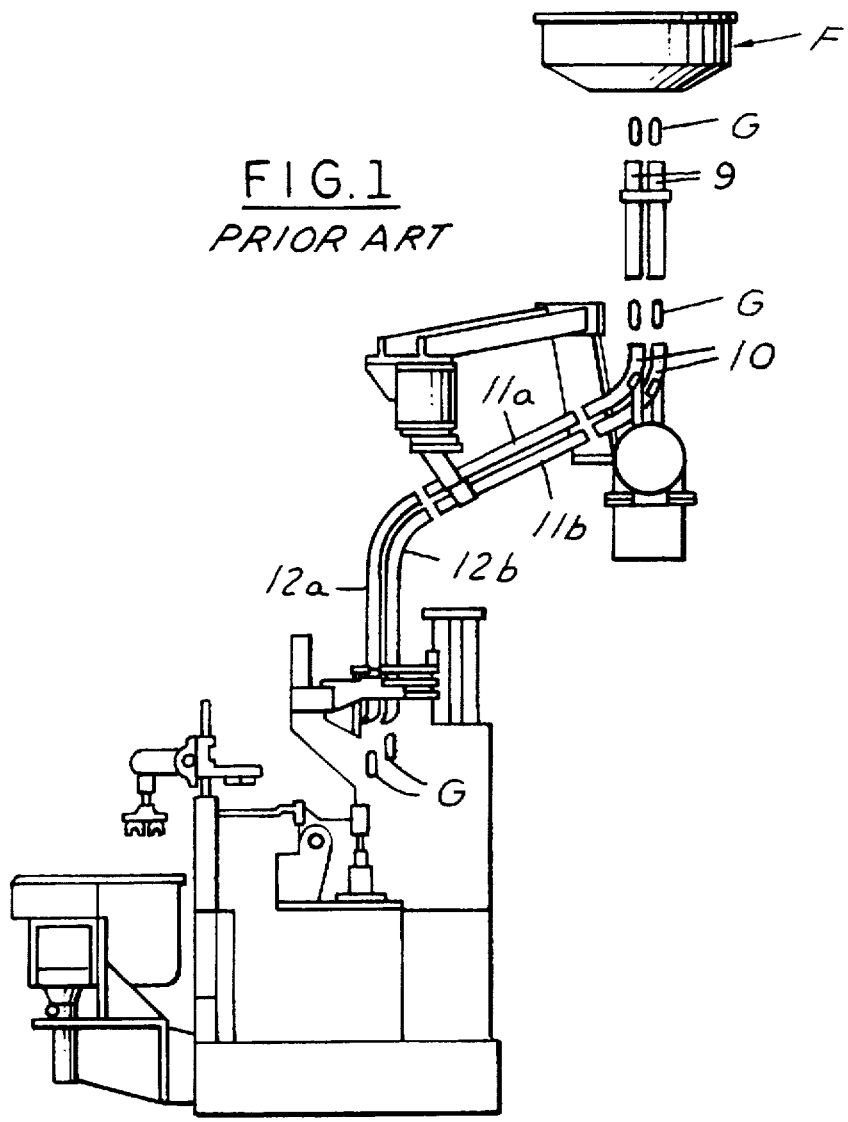
FIG. 1 is a schematic diagram of multiple glass gob delivery of the prior art.
Figure 1A:
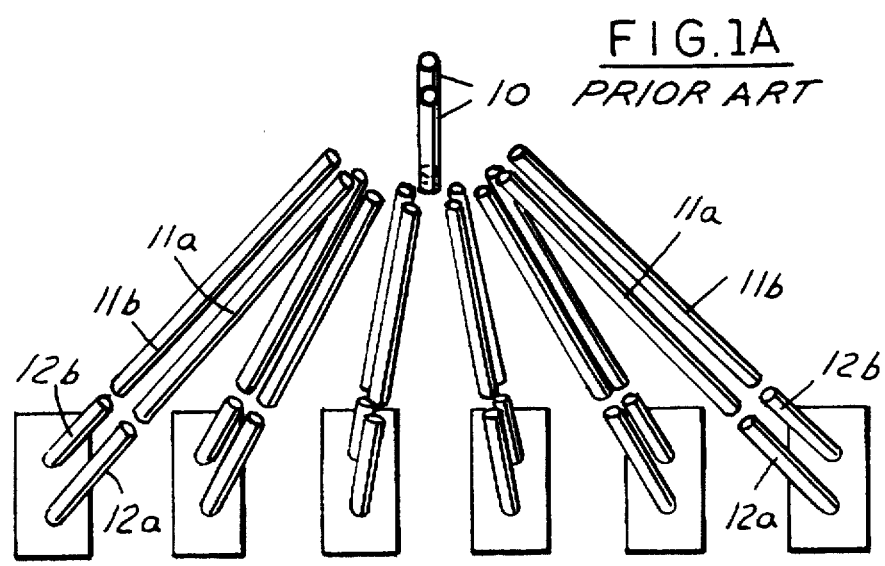
FIG. 1A is a top view of the prior art machine illustrated schematically in FIG. 1.
Figure 3:
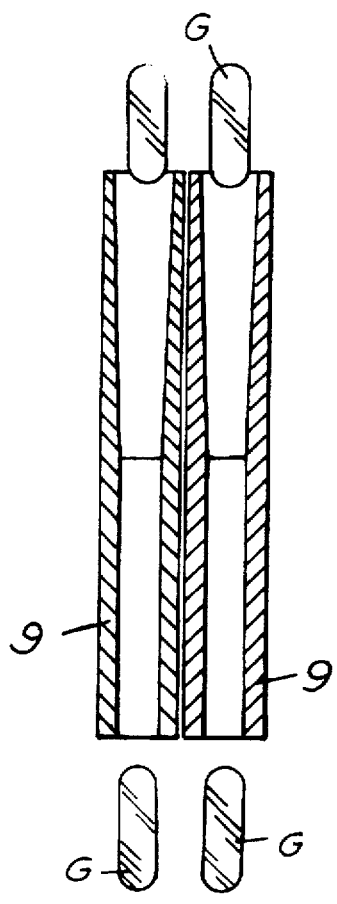
FIG. 3 is a schematic sectional view of a portion of the prior art apparatus shown in FIG. 1.

FIGS. 1 and 3 illustrate an apparatus wherein multiple glass gobs G are delivered from a feeder F to guide funnels 9 that delivers gobs to scoops 10 that are oscillated for delivering plural charges or gobs of glass to plural troughs 11$a$, 11$b$, in as many sections as there are in an I.S. machine and, in turn, to deflectors 12$a$, 12$b$ for guiding the gobs to the cavities of blank molds 13 associated with the I.S. glass making machine. As shown in FIGS. 1 and 3, in some instances gobs fail to arrive at the blank molds at the same time for a variety of reasons. Failure to arrive at the same time at a given section results from differences found at each gob path in delivery equipment designs. As a result of these differences, path lengths vary for each cavity, and therefore theoretical gob velocities are different for each gob at locations along the delivery path. This holds true if there were no frictional forces coming into play. However, frictional forces do play a major part in gob arrival time and velocity differences. Variations in these frictional forces are constantly occurring and are responsible for gob arrival variations from cycle to cycle.

It is desirable for optimum operation of the I.S. machine for gobs to arrive at the blank mold at a specific time in the forming cycle. Further, the best control of the overall forming process occurs when gobs arrive together at this specific time with no variations from cycle to cycle. In multiple cavity and section machines, all gobs associated with a given section should arrive at the blank at precisely the same time. Such an optimal operation is shown schematically in FIG. 2. The manner in which the gobs in the prior art may not be properly timed is shown schematically in connection with troughs in FIGS. 1 and 3. Thus, the gobs in the prior art have not arrived at the sections at the same time.

Figure 4:
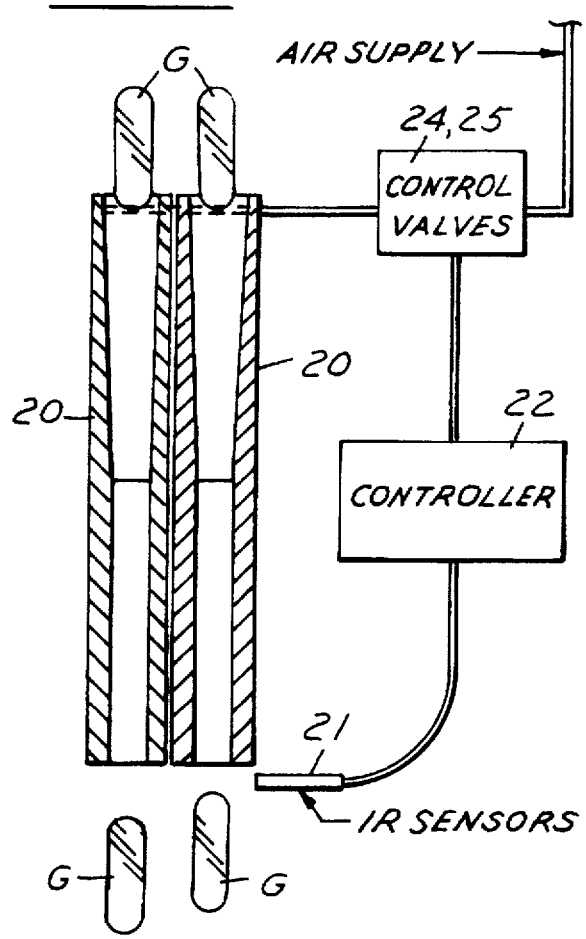
FIG. 4 is a schematic sectional view of a portion of the apparatus shown in FIG. 2.
Figure 5:
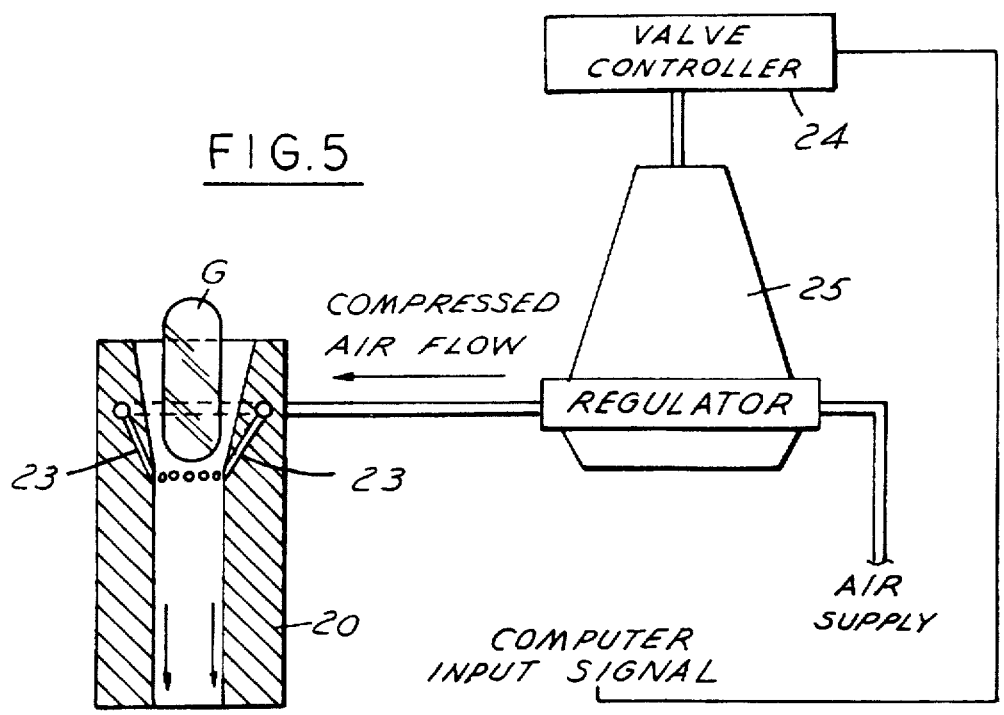
FIG. 5 is an electropneumatic schematic diagram of one portion of the invention.
Figure 6:
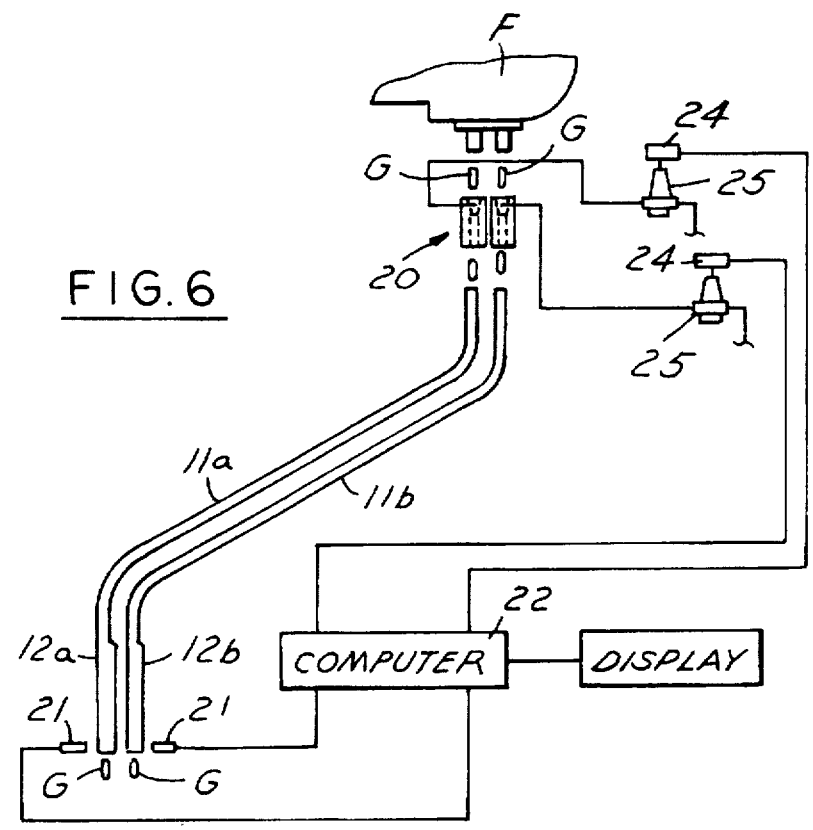
FIG. 6 is an electropneumatic schematic of a method and apparatus embodying the invention.

In accordance with the invention, as shown in FIGS. 4–6, use is made of a set of improved gob guides 20 that incorporate controlled air flow variably to boost the velocity of individual falling gobs by a desired amount. These guides are best located below the orifices of feeder F and above the receiving ends of scoops 10. In addition, two infrared gob sensors 21 are provided in each gob path, preferably at each guide funnel exit and at each deflector exit, to detect either the presence or absence of the gob, and thereby to provide an electrical signal indicative of passage of a hot gob in the associated path. The sensor signals are all directed to a computer 22 that includes a high speed clock which allows the determination of the precise time of gob arrival at each scoop exit. The computer provides output signals to a plurality of valves 24 and regulators 25 associated with each guide 20. The valves and regulators control boost air flow to circumferentially spaced angulated jet orifices 23 in each gob guide 20, and thereby influencing the gob exit velocity at the gob funnels.

The amount of boost air pressure to be used for a specific gob is decided by the computer. This decision is based on the most recent history of gob arrival times for the specific gob oath in question.

The computer is programmed to perform the following features:

1. Allow the operator to adjust the boost air on the gob guide funnels via the computer program to cause the advancing or retarding of a "master" gob for a given section to have a desired average arrival time.

2. Keep a running average of the arrival times of a number of most recent gob arrivals the each deflector exit.

3. Automatically vary the boost air pressure for a given "slave" gob to coax it to arrive at the deflector scoop exit at the same average time as the "master" gob for that section.

4. Keep a running record of the range of variation of the boost arrivals during for this group of most recent gob arrivals.

5. Provide a visual display 30 of the average arrival times and the range of arrival time variations.

6. Provide output signals to external systems (not shown) to allow automatic section shutdown in the event of extremely late gob arrivals.

Thus, the system of FIG. 6 is initially calibrated using "master" gobs to obtain a desired arrival time through each gob path. The jet orifices 23 are angulated in the direction of gob travel, as shown in FIG. 5, so that an increase in air flow will give greater assistance to the force of gravity on a passing gob, while a decrease in air flow will provide lesser assistance. Orifices 23 are uniformly circumferentially spaced to assist spacing of the gob from the guide sidewall. The angle of orifices 23 varies. A presently preferred angle range is between 24° and 30°. Thereafter, computer 22 monitors gob arrivals at sensors 21, and selectively increases or decreases air flow to one or more guide funnels 20 so as to maintain substantially simultaneously arrival of all gobs at the deflector exit. Computer 22 can also sense when a gob delivery path becomes blocked, or when a gob cannot be made to arrive as desired, and shut down one or more sections of the forming machine.

I claim:

1. In manufacture of glass articles wherein a plurality of at least two series of glass gobs are delivered from a corresponding plurality of sources to a corresponding plurality of blank molds in each section of an individual section (IS) glass manufacturing machine by means of a corresponding plurality of predetermined fixed paths to each section of the machine, each of said paths having an upper end at one of said sources and a lower end at one of said blank molds in each machine section, and each of said paths being for delivery of one of said series of glass gobs from its source to one of said blank molds, a method of controlling times of glass gob delivery to the blank molds of each machine section comprising the steps of:

(a) positioning at said upper end of each said path a gob guide having a plurality of angulated jet orifices disposed in a uniformly spaced circumferential array around said path, and coupling each of said gob guides and its array of orifices to an associated variable air supply such that air from each said supply impinges upon and assists force of gravity to accelerate a gob in each said path by an amount that varies with the amount of air delivered from the variable air supply to the gob guide in that path, (b) positioning a gob sensor at the lower end of each said path to sense time of arrival of a gob to the blank mold at the lower end of each said path, (c) sensing passage of a gob at said gob sensor at the lower end of one of said paths and determining from such sensed passage a gob arrival time of said one path to the associated blank mold of one machine section, and (d) automatically and individually adjusting air flow from said variable air supply through said jet orifices at each gob guide in the other of said paths to said one machine section such that gobs in all of said paths to all of said blank molds in said one machine section, as sensed by associated gob sensors at the lower end of each of said paths, arrive simultaneously at all of said blank molds of said one machine section.

2. The method set forth in claim 1 wherein said step (c) further comprises the step of adjusting timing of arrival of glass gobs in said one of said paths by varying air flow from said jet orifices at the gob guide in said one of said paths to obtain a desired gob arrival time at the blank mold at the lower end of said one of said paths.

3. The method set forth in claim 2 wherein said steps (c) and (d) are carried out independently for each section of said IS machine.

\* \* \* \* \*